Feb. 11, 1958   G. A. LYON   2,822,894
AIR COOLED WHEEL STRUCTURE
Filed Feb. 1, 1952
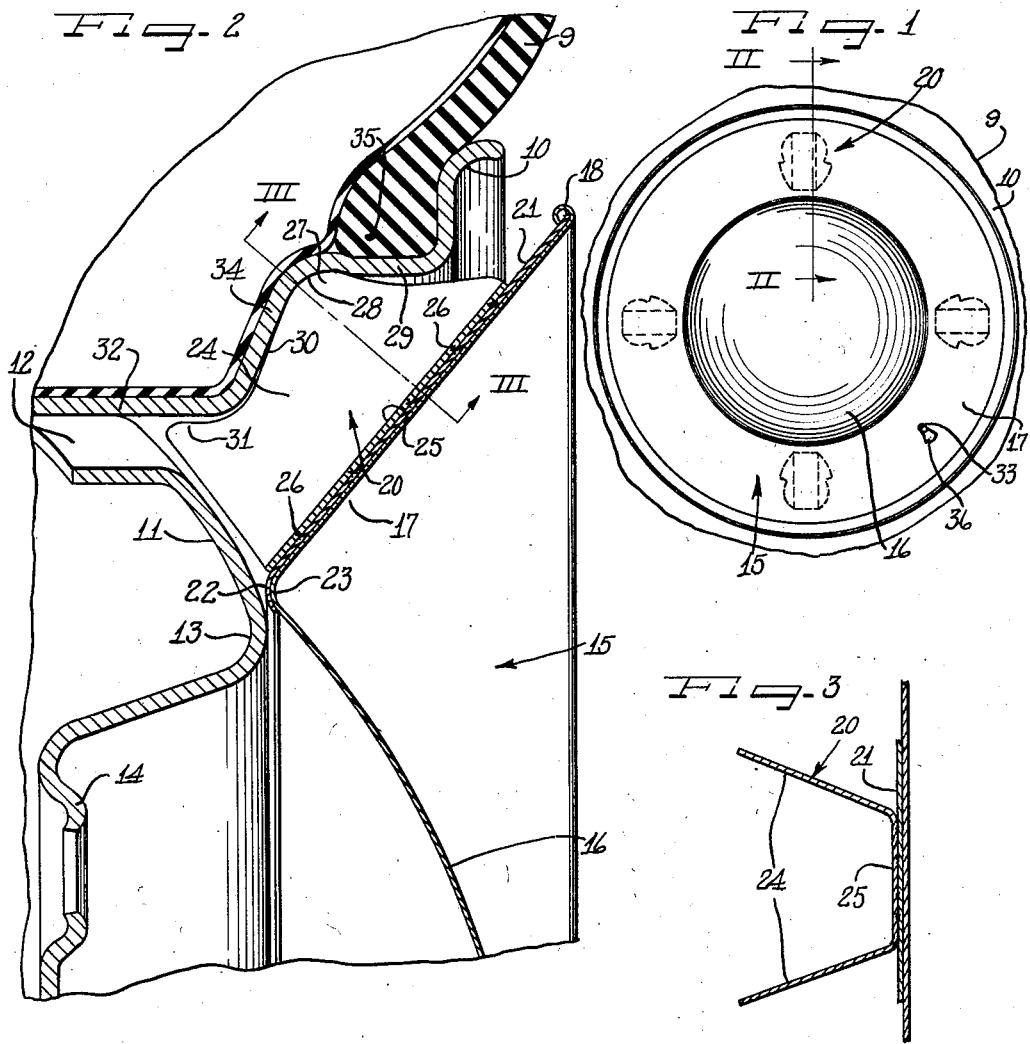
Inventor
George Albert Lyon

United States Patent Office 2,822,894
Patented Feb. 11, 1958

2,822,894

AIR COOLED WHEEL STRUCTURE

George Albert Lyon, Detroit, Mich.

Application February 1, 1952, Serial No. 269,396

4 Claims. (Cl. 188—264)

This invention relates to a wheel cover and more particularly to a modification of the automobile wheel cover of my copending patent application, Serial No. 259,546, filed December 3, 1951 and now abandoned.

An object of this invention is to provide a wheel cover with divergent projecting wings at its inner side interlocked in a simple way with the cover so as to position the wings for both retaining engagement with the wheel and for serving as air vanes to assist in cooling the wheel.

Yet another object of this invention is to provide a simple and economical way of securing air vane-retaining fingers to the back side of the cover without necessitating marring of the cover itself by welds, rivets or other similar attaching means.

In accordance with the general features of this invention there is provided in a cover structure for a wheel having an annular shoulder comprising a flange, a wheel cover having projected from a concealed and inner side thereof divergent resiliently flexible wings terminating in edges for detachable gripping engagement with the wheel flange and being movable apart upon initial engagement with said flange and movable toward each other thereafter to engage the flange and resiliently resist displacement from engagement with the flange, the wings comprising a separate element on the inner side of the cover interlocked with turned portions of the cover and without requiring the use of separate fastening means.

More specifically the aforesaid divergent wings comprise generally a U-shaped element with the wings projecting from the base of the U and with the base interlocked with the cover.

Yet another feature of the invention relates to so forming the cover and the retaining wings that they may be made from two simple sheet metal stampings.

Other objects and features of the invention will more fully appear from the following detailed description taken in connection with the accompanying drawing which illustrates a single embodiment thereof and in which:

Figure 1 is a fragmentary side view of a wheel structure having a cover embodying the features of this invention;

Figure 2 is an enlarged fragmentary cross-sectional view taken on the line II—II of Figure 1 looking in the direction indicated by the arrows;

Figure 3 is a fragmentary sectional view taken on the line III—III of Figure 2 looking in the direction indicated by the arrows and showing the cross-sectional shape of the element having the divergent cover retaining wings; and Figure 4 is a perspective view of one of the retaining elements comprising the aforesaid divergent cover retaining wings.

As shown on the drawing:

My novel cover is adapted for use with a conventional automobile wheel which includes a pneumatic tire and tube assembly 9 carried in the usual way upon a multiflanged drop center type of rim part 10 which in turn is supported upon a wheel body member or part 11. The body part 11 comprises a dished stamping and, as is well known in the art, is attached at spaced intervals to the base flange of the rim part leaving transverse wheel openings 12 alternating with the points of attachment. In reality the openings 12 cause the body part 11 to simulate a spoked structure although the openings permit of air circulating through the wheel and around the brake drum (not shown).

The body part 11 is of a bulged construction and includes a nose portion 13 and an indented central bolt-on flange 14 adapted to be secured by means of cap screws or bolts (not shown) to a brake drum or the like on an axle of the wheel.

In accordance with the features of this invention I provide a unitary wheel cover designated generally by the reference character 15 for concealing the exposed outer side of the wheel and for augmenting the circulation of air through the openings 12. This wheel cover 15 includes divergent unitary portions 16 and 17 formed from a dished metallic stamping. Any suitable metallic sheet may be used for making the portions 16 and 17 although I have attained excellent results by making the same of stainless steel coil stock as the same lends itself to a high lustrous finish.

The portion 17 has a turned outer peripheral edge 18 spaced from the rim part 10 so that air can circulate behind the cover.

Interlocked with this turned edge 18 is a winged or vaned structure designated generally by the reference character 20. This vaned structure includes a mounting plate 21 having its outer edge interlocked with the turned edge 18 and having an inner turned edge 22 wrapped around the curved junction portion 23 connecting portions 16 and 17 of the cover proper. In this manner I am enabled to attach the plate 21 to the back side of annular cover portion 17 without using any attaching means such as welds, rivets, clips or the like which might mar the appearance of the external surface of cover portion 17.

However, I do employ the plate 21 to serve as a support for the divergent wings or vanes 24—24. These wings 24—24 comprise the legs of a generally U-shaped member, the base 25 of which is welded to the supporting plate 21 (Figure 3). I have designated the welds in Figure 2 by the reference numeral 26. These welds would, of course, mar the appearance of the supporting plate 21 but this is immaterial since the plate is concealed by the cover portion 17 to which it is interlocked at 18—22.

Wings or vanes 24—24 extend in a general radial and oblique direction, facing generally circumferentially relative to the cover, and each terminates in a turned edge 27 adapted to snap into an annular groove 28 in the rim flange 29. Attention is also directed to the fact that the rear edge 30 of each wing is shaped to conform generally with the curvature of the rim flange 34 and has a turned radially inner extremity 31 for hugging under the base flange 32 of the rim (Figure 2).

The cover portion 17 may be provided with a hole 33 for accommodating the free end of the usual valve stem 36 projecting from the tire rim part 10.

The rear side of the cover 15 may be provided with any suitable number of pairs of the wings or vanes 24—24 and, as will be noted from Figure 1, I have shown four such pairs of wings although the number can be modified without deviating from the spirit of the invention.

In the application of the cover to the wheel the valve hole 33 is first aligned with the stem 36 and then the cover is pressed axially toward and into the wheel. This results in the curved free edges 27 of the wings or vanes 24 initially coming into contact with the flange 29 and being deflected laterally apart until such curved edges snap into the annular groove 28. The wings 24 should, of course, be made of resiliently flexible material such, for example, sheet steel so that they can have the snap-on action noted above.

Due to the fact that the wings of each pair are divergent, as shown in Figure 3, they will tend to separate upon camming contact with rim flange 29 but will move toward each other as they drop or snap into the rim groove 28. This rim groove 28 is now commonly used on automobile tire rims in connection with the locating of the tire bead 35 in the rim. Thus, I am enabled to use this same groove for an additional purpose. The vanes or wings 24, when in resilient gripping engagement with the rim flange 29, have their rear edges 30 adjacent the flange 34 of the rim. In addition, due to the fact that the wings 24—24 extend generally radially, they will enable air to circulate freely behind the cover 15 and through the wheel openings 12. Furthermore, upon rotation of the wheel, these wings will act as vanes to assist in directing or fanning air through the wheel body. This is only possible because the rear of the cover portion 17 is spaced from the rim part as previously described.

When it is desired to remove the cover, the same may be easily effected by inserting a suitable pry-off tool behind the cover portion 17 which, upon the application of a pry-off force thereto and to the cover, will result in the moving apart of the divergent wings 24—24 of the nearest pair, thereby freeing them from engagement in the groove 28 so that the cover can come off of the wheel.

Also, it should be noted that the wings or vanes 24—24 when in gripping engagement with rim flange 29 are under tension tending to bring them closer together so that they are thus enabled to resist accidental displacement of the cover from the wheel.

I claim as my invention:

1. In a wheel structure including a wheel body and a tire rim having a generally radially inwardly facing annular flange, a cover for disposition at the outer side of the wheel including a circular cover body for overlying the tire rim and the wheel body, an annular flange portion within the tire rim overlying a portion of the cover body, said flange portion being arranged for substantially telescoping into the wheel and providing a generally radially outwardly facing face that is arranged for opposing said tire rim flange in radially inwardly spaced relation, said cover flange portion face having thereon a plurality of circumferentially spaced cover retaining and turn-preventing retaining element units each of which comprises a generally U-shaped metal element including a base secured with a generally radially inwardly facing back surface thereof in backed up relation to said cover flange face and having a pair of divergently related retaining legs disposed obliquely to said base and directed in substantially opposite circumferential directions with edges thereon that extend normally to a diameter such that upon pressing the same into camming contact with the rim flange the legs will tend to resiliently yieldably separate to effect accommodation of the edges to the diameter of the engaged face of the rim flange and effect resilient gripping engagement of said edges with the rim flange for not only holding the cover in axial position on the wheel but also holding the cover against turning due to the oppositely circumferentially directed disposition of said edges.

2. A wheel structure as defined in claim 1, wherein the wheel body provides air circulation openings therethrough adjacent the tire rim, and the spacing of said cover flange face provides with the tire rim an air circulation passage communicating with said wheel opening, said retaining legs comprising air circulation promoting vanes in said passage.

3. A circular wheel cover adapted to be disposed in covering relation on the outer side of a vehicle wheel, the cover providing on the inner wheel opposing side thereof a circular generally radially facing surface that is adapted to oppose in generally telescopically related and substantially radially spaced relation an annular flange of the wheel to which the cover may be applied, said surface having a circumferentially spaced series of cover retaining wing-like cover retaining flange legs with each pair of legs connected by a base portion so that the cross-section of each pair of legs and the connecting base portion provides a generally U-shape, each of the base portions being backed against said cover surface so that pressure exerted against said flange legs thrusts said base portion toward said cover surface to thereby enhance resilient tensioning of the flange legs, said flange legs providing wheel engaging edges that project at the distal ends of the flange legs generally radially away from said cover surface and said base portions and to a diameter for engaging the opposing annular wheel flange in resilient gripping relation.

4. A cover as defined in claim 3, wherein said cover surface comprises a plate providing an annular member having opposite marginal portions thereof rigidly secured to the cover.

References Cited in the file of this patent

UNITED STATES PATENTS

| | | |
|---|---|---|
| 550,723 | Morgan | Dec. 3, 1895 |
| 1,953,634 | Reichenbach | Apr. 3, 1934 |
| 2,006,639 | Horn | July 2, 1935 |
| 2,102,471 | Lyon | Dec. 14, 1937 |
| 2,368,230 | Lyon | Jan. 30, 1945 |
| 2,433,854 | Lyon | Jan. 6, 1948 |
| 2,524,062 | Lyon | Oct. 3, 1950 |
| 2,705,172 | Lyon | Mar. 29, 1955 |

OTHER REFERENCES

Chrysler Brake Service, vol. 21, No. 5, page 14; May 1951.